(12) United States Patent
Yoshida

(10) Patent No.: US 6,705,632 B2
(45) Date of Patent: Mar. 16, 2004

(54) AUXILIARY WHEEL SUPPORT ARM WITH INCLINATION FUNCTION

(76) Inventor: Hiroshi Yoshida, 9-16-407, Nagamachi 5-chome, Taihaku-ku, Sendai-shi, Miyagi 982-0011 (JP)

( * ) Notice: Subject to any disclaimer, the term of this patent is extended or adjusted under 35 U.S.C. 154(b) by 0 days.

(21) Appl. No.: 10/122,593

(22) Filed: Apr. 15, 2002

(65) Prior Publication Data

US 2003/0193165 A1 Oct. 16, 2003

(51) Int. Cl.[7] ................................................. B62H 1/00
(52) U.S. Cl. ................................... 280/293; 280/288.4
(58) Field of Search ............................. 280/288.4, 293, 280/298, 301

(56) References Cited

U.S. PATENT DOCUMENTS

| | | | | |
|---|---|---|---|---|
| 4,326,729 A | * | 4/1982 | Luckowski et al. | 280/304 |
| 4,595,213 A | * | 6/1986 | Tsuchie | 280/293 |
| 5,064,213 A | * | 11/1991 | Storch | 280/301 |
| 5,100,163 A | * | 3/1992 | Egley et al. | 280/293 |
| 5,352,403 A | * | 10/1994 | Egley | 280/293 |
| 6,331,012 B1 | * | 12/2001 | Eisenmann et al. | 280/293 |

FOREIGN PATENT DOCUMENTS

| | | |
|---|---|---|
| JP | 30-10211 | 7/1955 |
| JP | 30-18211 | 12/1955 |
| JP | 56-116282 | 9/1981 |

* cited by examiner

*Primary Examiner*—Lesley D. Morris
*Assistant Examiner*—L. Lum
(74) *Attorney, Agent, or Firm*—Jordan and Hamburg LLP

(57) ABSTRACT

A support for an auxiliary wheel of a bicycle which provides an inclination function includes an auxiliary wheel support arm and a bicycle support arm, wherein the auxiliary wheel support arm and the bicycle support arm connect the bicycle and the auxiliary wheel. The auxiliary wheel support arm partially overlaps with the bicycle support arm, and the bicycle support arm and the auxiliary wheel support arm are pivotable relative to each other at the end near to the bicycle in the overlap portion. The bicycle support arm and the auxiliary wheel support arm are bound by a T-shaped binding bar and an elastic member in the overlap portion.

13 Claims, 6 Drawing Sheets

AUXILIARY WHEEL SUPPORT ARM WITH INCLINATION FUNCTION

BACKGROUND OF THE INVENTION

1. Field of the Invention

The present invention relates to a support arm which connects an auxiliary wheel of a bicycle to the bicycle and can be elastically bent to incline the bicycle.

2. Description of the Related Art

A conventional auxiliary wheel support arm cannot be elastically bent. Considering that the basis of the driving technique of a bicycle is to obtain balance by inclining the vehicle body, it can be said that the conventional auxiliary wheel support arm wherein bending is impossible is nothing else but a fall-preventing device for a bicycle.

Furthermore, such a device is also possible, where the bicycle support arm and the auxiliary wheel support arm are not overlapped onto each other, and they are merely pivoted to each other, and the bicycle support arm and the auxiliary wheel support arm are connected with an elastic member, so that elastic bending is possible. However, for this device, when a force is applied to the auxiliary wheel back and forth in the traveling direction by a collision between an obstacle on the road and the auxiliary wheel, the force is concentrated on the pivot part to thereby deform the support arm at the pivot part in the back and forth direction. As a result, the traveling direction of the auxiliary wheel is changed to a direction different from the traveling direction of the bicycle, and the device cannot be used unless a special reinforcing means is used.

When a bicycle with no auxiliary wheel turns at a curve, the driver maintains balance by inclining the vehicle body to the side of the turning. However, in the case of the bicycle with an auxiliary wheel using a conventional support arm, the support arm cannot be bent and the vehicle body cannot be inclined, and therefore, the rider does not fall, but on the other hand, it has been difficult to learn the driving technique since the practice of maintaining balance by inclining the vehicle body cannot be done. Furthermore, there have been many beginners who let the bicycle fall just at the moment when the auxiliary wheel is removed, and who make it furthermore difficult to learn the driving technique because of the feeling of fear of falling. The present invention is made to eliminate these disadvantages.

SUMMARY OF THE INVENTION

An auxiliary wheel support arm with an inclination function in accordance with the present invention includes a vertically elastically bending part that is arranged at an intermediate location of the support arm connecting the bicycle and the auxiliary wheel.

More specifically, there is provided an auxiliary wheel support with an inclination function comprising an auxiliary wheel support arm and a bicycle support arm, wherein the auxiliary wheel support arm and the bicycle support arm connect the bicycle and the auxiliary wheel. The auxiliary wheel support arm partially overlaps with the bicycle support arm. The bicycle support arm and the auxiliary wheel support arm are vertically movable and pivoted to each other at the end near to the bicycle in the overlap portion. The bicycle support arm and the auxiliary wheel support arm are bound by a T-shaped binding bar and an elastic member in the overlap portion.

When the auxiliary wheel support arm with an inclination function in accordance with the present invention is used, it becomes possible to practice maintaining balance by inclining the vehicle body, which is the basis of the driving technique of a bicycle. It is significantly different from the conventional auxiliary wheel support arm in that while the conventional auxiliary wheel support arm is merely a fall-preventing device, the auxiliary wheel support arm with an inclination function in accordance with the present invention can be elastically bent, and it is possible to practice maintaining balance by inclining the vehicle body, which is the basis of the driving technique of a bicycle, and therefore, it can be called a bicycle driving training tool.

DETAILED DESCRIPTION OF THE PREFERRED EMBODIMENTS

The preferred embodiment of the present invention will be described below. Initially, at an intermediate location of the support arm connecting the bicycle and the auxiliary wheel, the bicycle support arm 1 and the auxiliary wheel support arm 2 are overlapped onto each other with the bicycle support arm 1 being positioned below the auxiliary wheel support arm 2. The bicycle support arm 1 includes a hole 12 in a vertical portion for connecting it to the bicycle.

Figure 8:
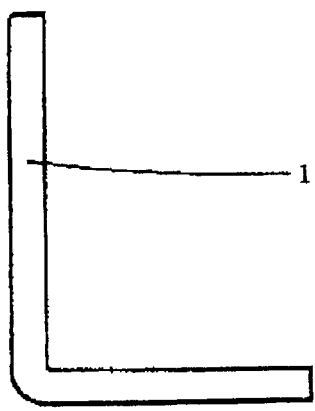
FIG. 8 is a front view of a bicycle support arm of the preferred embodiment shown in FIG. 1 wherein a rear view is symmetrical.
Figure 11:
FIG. 11 is a plan view of the bicycle support arm of the preferred embodiment shown in FIG. 1.
Figure 12:
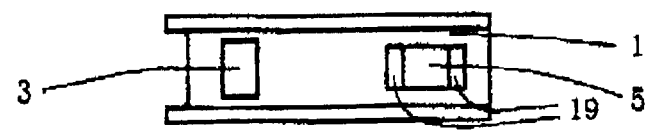
FIG. 12 is a bottom view of the bicycle support arm of the preferred embodiment shown in FIG. 1.
Figure 13:
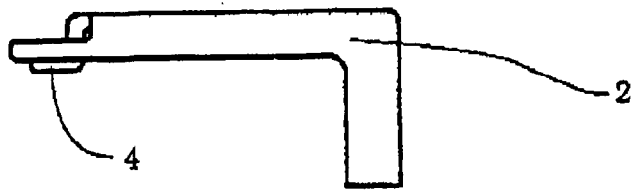
FIG. 13 is a front view of an auxiliary wheel support arm of the preferred embodiment shown in FIG. 1 wherein a rear view is symmetrical.
Figure 14:
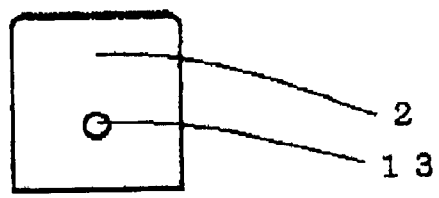
FIG. 14 is a right side view of the auxiliary wheel support arm of the preferred embodiment shown in FIG. 1.
Figure 15:
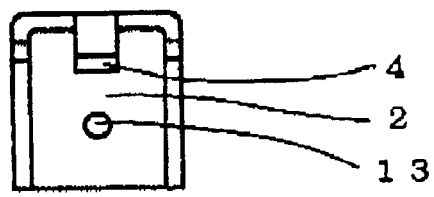
FIG. 15 is a left side view of the auxiliary wheel support arm of the preferred embodiment shown in FIG. 1.
Figure 16:
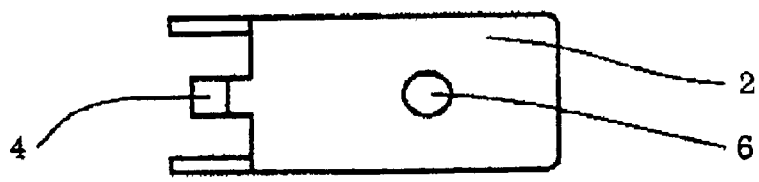
FIG. 16 is a plan view of the auxiliary wheel support arm of the preferred embodiment shown in FIG. 1.
Figure 17:
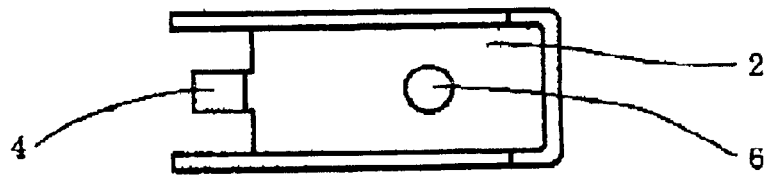
FIG. 17 is a bottom view of the auxiliary wheel support arm of the preferred embodiment shown in FIG. 1.
Figure 18:
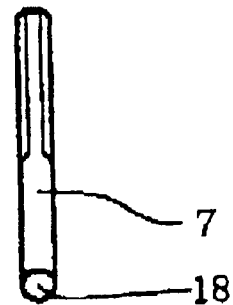
FIG. 18 is a front view of the binding bar of the preferred embodiment shown in FIG. 1 wherein a rear view is symmetrical.
Figure 19:
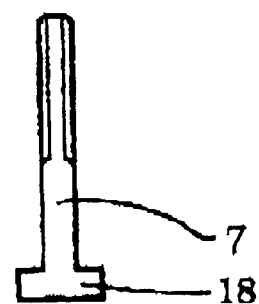
FIG. 19 is a right side view of the binding bar of the preferred embodiment shown in FIG. 1 wherein a left side view of the binding bar is symmetrical.
Figure 20:
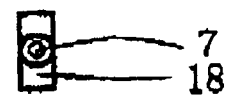
FIG. 20 is a plan view of the binding bar of the preferred embodiment shown in FIG. 1.
Figure 21:
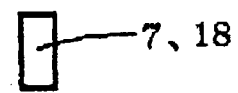
FIG. 21 is a bottom view of the binding bar of the preferred embodiment shown in FIG. 1.

At the part of the end near to the bicycle in the overlapped support arm parts 1,2, a hole 3 is pierced in the bicycle support arm 1, and a projection 4 is made at the end of the auxiliary wheel support arm 2, and the projection 4 is inserted into the hole 3, so that a vertically movable and pivoting coupling is made. As shown in FIG. 8, the bicycle support arm 1 has a vertical portion and a horizontal portion and as shown in FIGS. 11 and 12, the hole 3 is formed in the horizontal portion. As shown in FIGS. 13–17, the auxiliary wheel support arm 2 has a vertical portion adapted to connect to an auxiliary wheel 14 via a hole 13 and a horizontal portion on which the projection 4 is made.

Then, a hole 5 and a hole 6 are pierced vertically coaxially in the bicycle support arm 1 and the auxiliary wheel support arm 2 at the overlapped support arm parts, respectively. The hole 5 is made in the horizontal portion of the bicycle support arm 1 (see FIGS. 11 and 12) and the hole 6 is made in the horizontal portion of the auxiliary wheel support arm 2 (see FIGS. 16 and 17).

A binding bar 7 in the form of a reversed "T" having a screw thread made at the upper part thereof is passed through the hole 5 and the hole 6 from the lower side.

A T-shaped crossbar portion 18 of the binding bar 7 is made to cross the bicycle support arm 1 at right angles. As such, the binding bar 7 has a vertical portion extending through the holes 5,6 and a horizontal portion arranged below the bicycle support arm 1 (see FIGS. 6 and 7).

Figure 9:
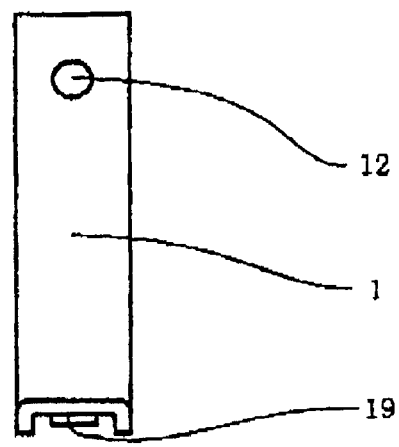
FIG. 9 is a right side view of the bicycle support arm of the preferred embodiment shown in FIG. 1.
Figure 10:
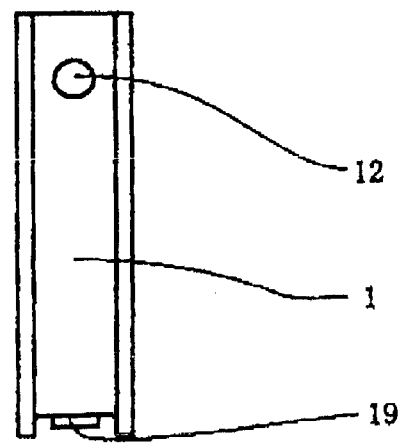
FIG. 10 is a left side view of the bicycle support arm of the preferred embodiment shown in FIG. 1.

Projections 19 are made on both sides in the orthogonal direction along the hole 5 at the lower part of the bicycle support arm 1 (see FIGS. 9, 10 and 12).

A spring bracket 8, a spiral spring 9, and a spring bracket 10 are in turn put on the binding bar 7 from the upper side.

A spring clamping nut 11 is attached to the screw thread part at the upper part of the binding bar 7.

Figure 1:
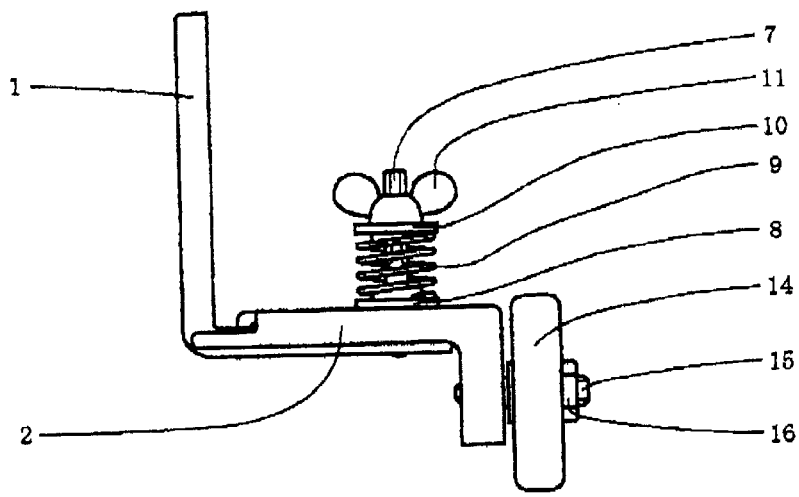
FIG. 1 is a front view of a preferred embodiment of an auxiliary wheel support arm shown mounted in connection with a bicycle support arm and wherein a rear view is symmetrical except for the part of the spiral spring.
Figure 2:
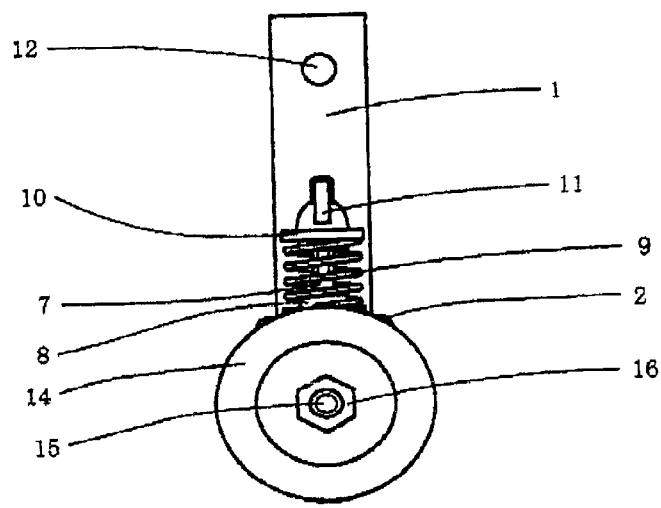
FIG. 2 is a right side view of the preferred embodiment shown in FIG. 1.
Figure 3:
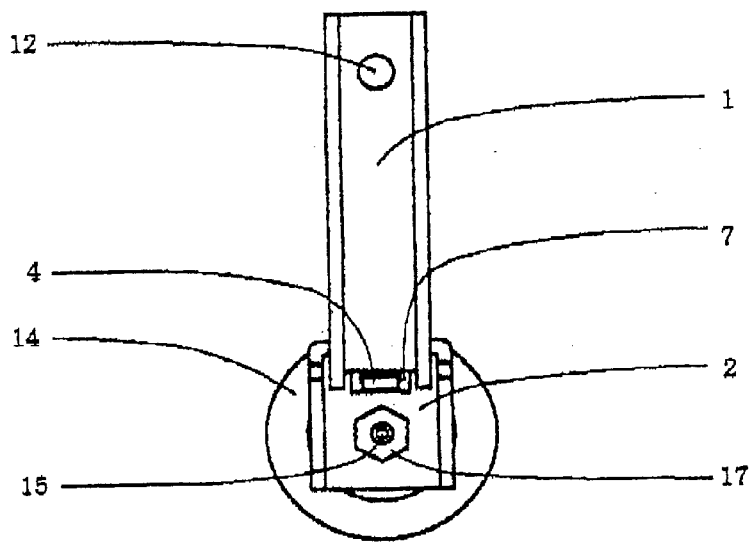
FIG. 3 is a left side view of the preferred embodiment shown in FIG. 1.
Figure 4:
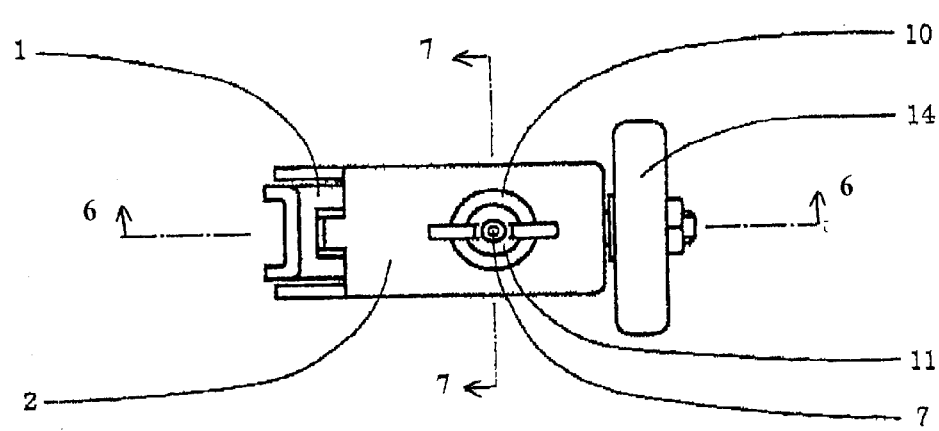
FIG. 4 is a plan view of the preferred embodiment shown in FIG. 1.
Figure 5:
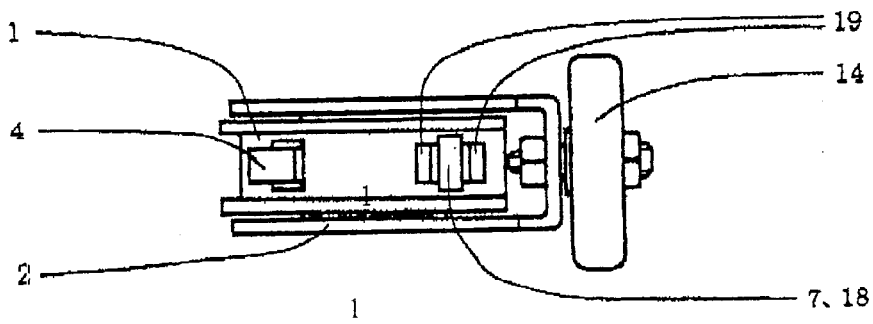
FIG. 5 is a bottom view of the preferred embodiment shown in FIG. 1.
Figure 6:
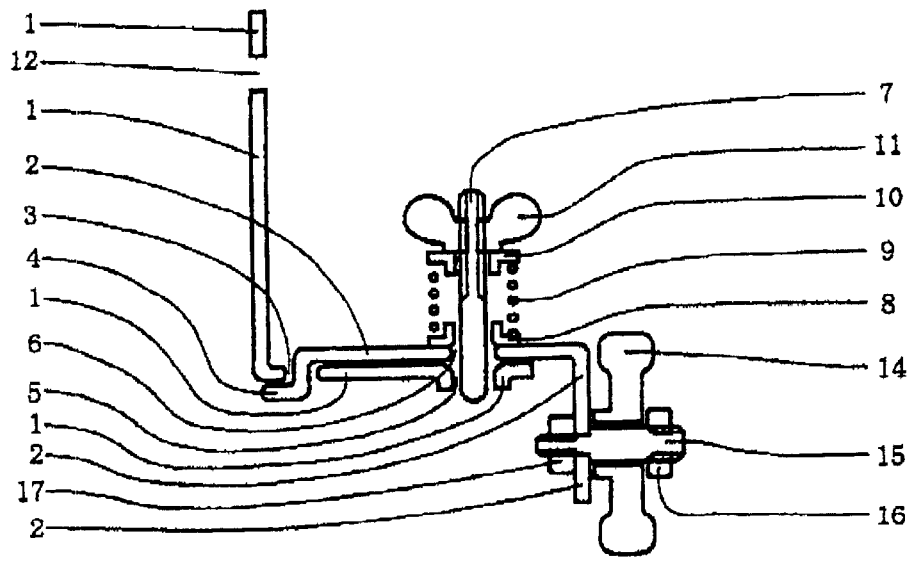
FIG. 6 is a cross sectional view of the preferred embodiment shown in FIG. 1 taken along the line 6—6 in FIG. 4.
Figure 7:
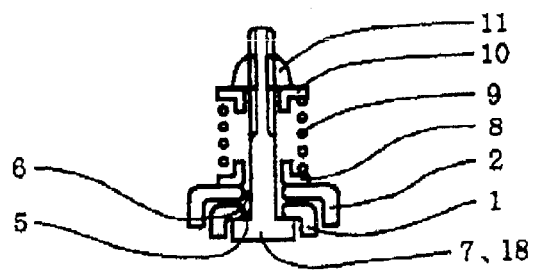
FIG. 7 is a cross sectional view of the preferred embodiment shown in FIG. 1 taken along the line 7—7 in FIG. 4.

As shown in FIG. 6, the auxiliary wheel support arm 2 is connected to the auxiliary wheel 14 by passing a bolt 15 through the hole 13 in the auxiliary wheel support arm 2 and a hole in the auxiliary wheel 14 and then threading nuts 16,17 to the bolt 15 (one on each side of the auxiliary wheel 14). The nuts 16,17 are tightened to the bolt 15.

The auxiliary wheel support arm with an inclination function in accordance with the present invention can be elastically bent, and therefore, the beginner can practice maintaining balance by inclining the vehicle body without having any anxiety of falling off of the vehicle body. Accordingly, when the auxiliary wheel support arm in accordance with the present invention is used, learning the bicycle driving technique becomes easier by leaps and bounds than in the case where a conventional auxiliary wheel is used.

Furthermore, in the case of the bicycle with an auxiliary wheel using the conventional support arm that cannot be elastically bent, when the auxiliary wheel rides over a little projection on the road surface, the rear wheel of the bicycle is separated from the road surface, and the rotation of the rear wheel cannot be transferred to the road surface, and therefore, the running may become impossible. However, if the auxiliary wheel support arm in accordance with the present invention is used, the support arm can be elastically bent, and therefore, such an event does not occur.

Moreover, in a preferred embodiment of the auxiliary wheel support arm in accordance with the present invention, it is possible to control the strength of the spiral spring 9 and the maximum angle of bending of the support arm 2 by adjusting the degree of clamping of the spring clamping nut 11. Accordingly, the state can gradually be adjusted from a state of the conventional auxiliary wheel support arm where the support arm cannot be bent to a state near the state where an auxiliary wheel whose support arm can be significantly bent is not used, according to the degree of learning of the driving technique, and therefore, the learning of the driving technique becomes even easier.

Furthermore, when compared with the case of the prior art where the bicycle support arm and the auxiliary wheel support arm are not overlapped, and they are merely pivoted to each other, and the bicycle support arm and the auxiliary wheel support arm are connected with an elastic member, in the case of the auxiliary wheel support arm in accordance with the present invention, the bicycle support arm and the auxiliary wheel support arm are overlapped onto each other and are united with an elastic member. Therefore, even if a force is applied onto the auxiliary wheel back and forth in the traveling direction, the force is not concentrated only to the pivoted part. Accordingly, even if the auxiliary wheel runs into an obstacle on the road and the force is applied onto the auxiliary wheel back and forth in the traveling direction, the support arm is deformed or damaged in the back and forth direction at the pivoted part, and it is hard to cause such a problem that the traveling direction of the auxiliary wheel is changed to a direction different from the traveling direction of the bicycle.

Moreover, in the case of the auxiliary wheel support arm in accordance with the present invention, the crossbar portion 18 that is attached to the binding bar 7 like a "T" crosses the bicycle support arm 1 at right angles, and the above-described crossbar portion 18 is held between the projections 19 of the bicycle support arm 1 to keep the crossing at right angles. Furthermore, the crossbar portion 18 is tightened in the direction of the bicycle support arm 1 with the spiral spring 9 mounted on the binding bar 7. As a result of this construction, the shift in the traveling direction of the auxiliary wheel support arm 2 that is caused by the collision between the obstacle on the road and the auxiliary wheel or the like is restored to the original state by tightening the clearance between the crossbar portion 18 and the bicycle support arm 1 that is caused by the inclination of the binding bar 7. That is, in the case of the auxiliary wheel support arm in accordance with the present invention, not only the vertical force applied to the auxiliary wheel but also the force in the back and forth direction is absorbed and the state is restored to the original state, and therefore, the number of damages is significantly smaller than that in the case where the bicycle support arm and the auxiliary wheel support arm are not overlapped onto each other arid are merely pivoted to each other.

Furthermore, in the case of the prior art where the bicycle support arm and the auxiliary wheel support arm are not overlapped onto each other and are merely pivoted to each other, it is impossible to gradually control the maximum angle of inclination, but on the contrary, in the case of the auxiliary wheel support arm in accordance with the present invention, this can be done. This is a large difference in the point that it becomes easier for the beginner to learn the driving technique of a bicycle.

Furthermore, it seems at a first glance that the same effect as the present invention can be expected in such a way where the auxiliary wheel is mounted at the tip of a bicycle standing device and the elastic bending is made possible at the bicycle mounting part of the standing device, but it is not true. That is, if the auxiliary wheel is mounted merely at the tip of the bicycle standing device, the distance between the bicycle rear wheel shaft and the auxiliary wheel is fixed, and therefore, when the bicycle is inclined at a curve, the bicycle rear wheel floats up from the road surface by using the auxiliary wheel as the fulcrum, unless the auxiliary wheel slips laterally. This is a very dangerous problem. In the case of the auxiliary wheel support arm in accordance with the present invention, the auxiliary wheel support arm can be bent to change the distance between the bicycle rear wheel shaft and the auxiliary wheel. That is, the auxiliary wheel moves up and down, and therefore, such a problem is not caused.

What is claimed is:

1. A support for an auxiliary wheel of a bicycle, comprising:
    a bicycle support arm adapted to be connected to the bicycle;
    an auxiliary wheel support arm having a first end adapted to be connected to the auxiliary wheel and a second end opposite to said first end, said auxiliary wheel support arm partially overlapping with said bicycle support arm to form an overlap portion, said bicycle support arm having a first hole and a second hole in said overlap portion, said auxiliary wheel support arm having a projection arranged proximate said second end and inserted into said first hole in said bicycle support arm, said auxiliary wheel support arm having a hole in said overlap portion aligning with said second hole in said bicycle support arm, said bicycle support arm including projections arranged on a lower surface on both sides of said second hole;
    a T-shaped binding bar having a horizontal portion and a vertical portion substantially perpendicular to said horizontal portion, said vertical portion of said binding bar extending through said second hole of said bicycle support arm and said hole of said auxiliary wheel support arm, said horizontal portion of the binding bar being arranged below said auxiliary wheel support arm and said bicycle support arm; and
    an elastic member arranged in connection with said binding bar,
    said binding bar having at least one stop for said elastic member.

2. The support of claim 1, wherein said bicycle support arm has a vertical portion and a horizontal portion, said auxiliary wheel support arm having a horizontal portion arranged above said horizontal portion of said bicycle support arm.

3. The support of claim 2, wherein said first and second holes of said bicycle support arm are arranged on said horizontal portion of said bicycle support arm.

4. The support of claim 2, wherein said hole of said auxiliary wheel support arm is arranged on said horizontal portion.

5. The support of claim 2, wherein said first hole of said bicycle support arm is arranged proximate said vertical portion.

6. The support of claim 1, wherein said binding bar includes threads at a free end of said vertical portion, further comprising a spring clamping nut engaging with said threads and arranged to adjust said elastic member.

7. The support of claim 1, wherein said elastic member is arranged above said auxiliary wheel support arm.

8. The support of claim 1, wherein said auxiliary wheel support arm has a horizontal portion and a vertical portion at said first end, said vertical portion including a hole for enabling mounting of the auxiliary wheel.

9. The support of claim 1, wherein said auxiliary wheel support arm has a horizontal portion and a vertical portion at said first end, said projection being formed on said horizontal portion.

10. The support of claim 1, wherein said elastic member is a spring.

11. The support of claim 1, wherein each of said at least one stop of said binding bar is a bracket.

12. The support of claim 1, wherein said hole in said auxiliary wheel support arm is arranged between said projection and said first end of said auxiliary wheel support arm.

13. The support of claim 1, wherein said bicycle support arm is substantially L-shaped.

* * * * *